United States Patent [19]  
Hofmann et al.

[11] Patent Number: 4,666,167  
[45] Date of Patent: May 19, 1987

[54] STRESS BUSHING FOR PROFILE-STRESSING OBJECTS

[75] Inventors: Hans Hofmann, Rückersdorf; Heinz Ziegler, Engelthal, both of Fed. Rep. of Germany

[73] Assignee: Emuge-Werk Richard Glimpel Fabrik fur Prazisionswekzeuge Vormals, Fed. Rep. of Germany

[21] Appl. No.: 704,219

[22] Filed: Feb. 22, 1985

[30] Foreign Application Priority Data

Feb. 24, 1984 [DE] Fed. Rep. of Germany ....... 3406638

[51] Int. Cl.⁴ .............................................. B23B 31/40
[52] U.S. Cl. .................................. 279/2 R; 269/48.1; 279/1 Q
[58] Field of Search ............. 279/2 R, 1 Q; 269/48.1, 269/48.3; 242/46.5, 72; 403/365, 368, 370, 372

[56] References Cited

U.S. PATENT DOCUMENTS

| | | | |
|---|---|---|---|
| 2,699,656 | 1/1955 | Anderson et al. | 279/1 Q |
| 2,765,175 | 10/1956 | Parker, Jr. et al. | 279/1 Q |
| 3,117,797 | 1/1964 | Buck | 279/2 R |
| 3,168,388 | 2/1965 | Spieth | 279/2 X |
| 3,772,447 | 9/1966 | Ewing et al. | 279/2 R X |
| 3,995,967 | 12/1976 | Haller | 279/2 R X |
| 4,025,214 | 5/1977 | Spieth | 403/372 X |
| 4,106,783 | 8/1978 | Glimpel | 279/2 R |
| 4,284,283 | 8/1981 | Stermann | 279/2 R |

FOREIGN PATENT DOCUMENTS

| | | |
|---|---|---|
| 951856 | 8/1952 | Fed. Rep. of Germany . |
| 2851711 | 6/1980 | Fed. Rep. of Germany . |
| 717403 | 10/1954 | United Kingdom ............... 279/2 R |

Primary Examiner—Gil Weidenfeld  
Assistant Examiner—Glenn L. Webb  
Attorney, Agent, or Firm—Holman & Stern

[57] ABSTRACT

An elastic stress bushing comprising profiled prominences disposed at isolated locations, said profiled prominences having outer stressing surfaces, whereby the presence of the profiled prominences does not detract from the elastic properties of the overall stress bushing. This is achieved by providing for outwardly open grooves and at least one inwardly open groove on each bushing, which grooves are delimited by annular web segments and cylindrical stress covers. When the elastic bushing is compressed axially, it expands outward radially. In this way, the elastic bushing may support a workpiece, tool, hollow flywheel or sprocket, etc. from within the interior surface(s) of these structures.

6 Claims, 6 Drawing Figures

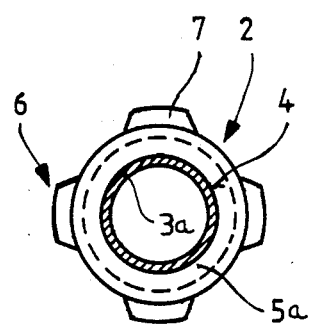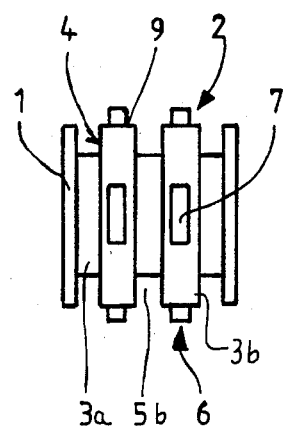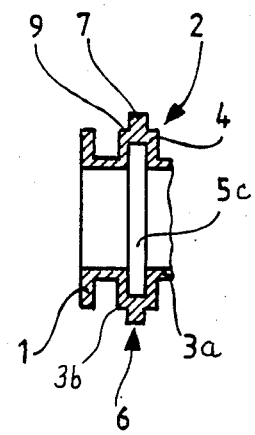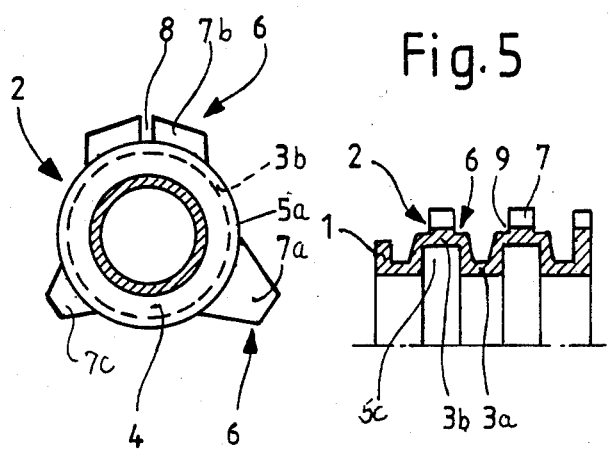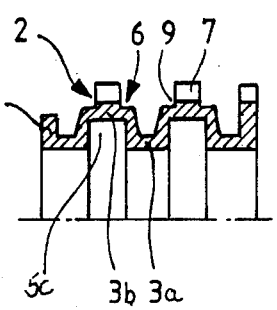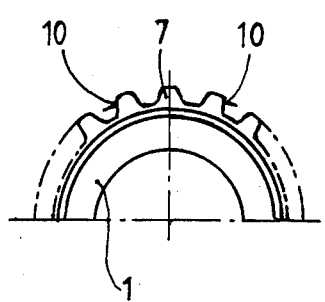

STRESS BUSHING FOR PROFILE-STRESSING OBJECTS

GENERAL FIELD OF THE INVENTION

The invention relates to a stress bushing for either interiorly or exteriorly directed stressing.

In a known stress bushing of this type (Ger. OS 28 51 711), an elastic bushing is employed which is provided with overlapping axial slots, with said slots forming free inelastic longitudinal strips on which two longitudinal ridges run, said ridges extending over the entire axial length of the stress bushing. These longitudinal strips are free of slots and serve to support the profiled strips. Thus, such a bushing has substantially inferior elastic properties compared with those of a similar design which is not equipped for profile stressing and which is free of slot-free longitudinal strips.

Another known elastic bushing for profile-stressing (Ger. Pat. No. 951,846) provides both outwardly open and inwardly open grooves which are delimited by closed, circular web members and encircling stress covers. This bushing expands radially when compressed axially. However, in the regions not equipped with profiled prominences, the stress covers and web structures are not present. This too results in substantial interference with achieving optimal elastic properties for said stress bushing.

Accordingly, it is an object of the invention to devise a stressing arrangement of the basic type described supra, wherein between a stress bushing and an object to be stressed there is no or negligible deterioration of the elastic properties of the stress bushing.

SUMMARY OF INVENTION

This object is achieved by the invented elastic stress bushing, which is characterized in that said bushing includes one (or perhaps two) stressing element(s) which comprises outwardly open grooves and at least one inwardly open groove, which grooves are delimited by annular web structures and cylindrical stress covers, whereby said elastic bushing expands radially when compressed axially. Said bushing also comprises insolated stressing regions disposed cylindrically around a center axis, whereby said bushing possesses an elastically deformable diameter. This elastic bushing further contains individuated, tooth-like profiled prominent regions distributed around its circumference which contact and support the hollow object (workpiece, tool, etc.) in cooperation with the stressing regions.

It is somewhat surprising that the invention achieves the object posed by employing an elastic stressing element comprising radial grooves formed from web structures and stress covers. For achieving this profiled prominences (protrusions) are provided on top of the stress covers. A profiled prominence is formed by a stacked arrangement of two or more contiguous protruding structures, the casing (outer) surfaces of which are the load-bearing, stress surfaces. The elastic properties of the invented stress bushing for profile-stressing are superior to all comparable known stress bushing for profile-considerably.

Moreover, the elastic properties of the stress bushing are found only to be minimally affected by the presence of the profiled prominence.

Within the scope of this invention, it is possible to provide only a single stressing element with at least three profiled prominences. As a rule, two, three or four sets of prominences are provided axially over the length of the bushing, and the circumferential distance between two neighboring profiled prominences in a single set is equal to or greater than the length of one profiled prominence in the circumferential direction. The prominences are generally distributed symmetrically around the circumference of the bushing. Their heights in the radial direction may be uniform or varying, and their lengths (circumferential) may be the same or different.

It is also possible to divide an excessively long profiled prominence by an axial groove whose width (circumferential) is much less than the circumferential length of said profiled prominence.

It is particularly advantageous if two or more stressing elements with profiled prominences are provided axially along the stress bushings whereby improved profile-stressing may result. As a rule, for any given stress cover there is mounted thereon only one profiled prominence along that axial direction.

It is thus conceivable for the profiled prominences to extend over the entire circumference of the respective stress covers. However, it is better if each prominence extends over only a part of the load-bearing surface of the stress cover. This feature reduces interference with the elastic properties of the overall bushing to the level of complete insignificance. Therefore, reducing the circumferential length of the profiled prominences with respect to that of the stress cover(s) enables the stress bushing to be employed for profile-stressing without causing any significant deterioration of the elastic properties of the overall stress bushing itself.

It is preferred to provide on a single stress bushing two stress elements along the axial direction thereof and thus separated by a groove. However, only one profile prominence is to be provided per outer stress cover, along the radial direction of each stress element. A minimum of three outer stress covers (and therefore profile prominences) should be arranged for each such stress element.

The invention may be employed for either interiorly directed or exteriorly directed (preferred embodiment and context) stressing. For interiorly directed stressing, the profiled prominences would be provided on at least one interior stress cover of each stress element of the bushing in the reverse fashion of this disclosed/claimed invention.

Profiled prominences of minimal (radial) height are conceivable. However, it is advantageous if the height of each protruding structure above the stress cover is at least half the thickness of the outer stress cover, and preferable at least equal to the thickness of said stress cover. Even at such height, the interference by the profiled prominences with the overall elastic properties of the stress bushing will be negligible.

The stressing force applied to the surface of the profiled prominences is generally radially-directed and on the outermost circumferential surfaces. It is particularly advantageous, however, if this stressing surface is associated with inclined sides on each of the profiled prominences. This configuration, which is generally employed in the stressing of nonsolid, hollow gear wheels, is an application to which this invention is particularly directed.

Preferred embodiments of the invention are illustrated in the drawings.

BRIEF DESCRIPTION OF THE DRAWINGS

FIG. 1 is a front view of one embodiment of a stress bushing for profile-stressing hollow cylindrical objects;

FIG. 2 is a side view of the stress bushing according to FIG. 1;

FIG. 3 is a partial side cross-sectional view of the stress bushing according to FIG. 2;

FIG. 4 is a front view of a second embodiment of a stress bushing for profile-stressing;

FIG. 5 is a side cross section of a third embodiment of a stress bushing for profile-stressing; and FIG. 6 is a front view of a fourth embodiment of a stress bushing which is otherwise according to FIG. 5.

DETAILED DESCRIPTION OF FIGURES

The elastic stress bushings illustrated in FIGS. 1-5 have square-wave-type axial profiles and each comprise two outer flanges 1 and two complete stressing elements 2. Each stressing element 2 comprises a smooth cylindrical (axial) inner stress cover 3a, two radially annular web segments 4, and a broken cylindrical (axial) outer stress cover 3b. All the stress covers and web segments are collectively of an annular one-piece configuration made of metal, and in the axial spaces between the separate protrusions 6 form grooves 5a. Additionally, this design renders two sets of radial grooves, one kind outwardly open, 5b, and the other kind inwardly open 5c.

The stress bushing of FIGS. 1 to 3 comprises four identically profiled prominences 6 which are distributed symmetrically around the circumference of each of the outer stress covers 3b. But, each protrusion 6 consists of two similar sections, the outermost of which is the profiled prominence 7, which is frustum-like. The radialy outermost sides (casing surfaces) of the profiled prominences 7 bear the radial load applied against the inner surfaces of the hollow workpiece, tool or other object (not shown) which is to be stressed and supported from within. In short, the invented stress bushing is intended to operate on the inside diameter of said workpiece, etc.

In FIG. 4, three different profiled prominences 7 are distributed around the circumference of the stress bushing, two, 7a and 7b, whose circumferential lengths are relatively long, and one, 7c, whose length is relatively short. Of the two circumferentially longer prominences, one 7a is much taller than any other such member 7b or 7c. One of the profiled prominence 7b is subdivided at its middle by an axial groove 8, the circumferential length of which is less than one third the overall circumferential length of the profiled prominence 7b.

As seen also in FIGS. 2, 3, and 5, the profiled prominences 7 are each centrally disposed on the outer stress covers 3b, and each prominence 7 has a recess 9 on either side in the axial direction.

In FIG. 6, the lateral stressing surfaces of profiled prominences 7 are comprised of radially inclined side surfaces 10. In this embodiment, the prominences 7 are uniformly distributed over the entire circumference of the stressing element 2 like the teeth of gear wheel, or sprocket. However, in the embodiment of FIG. 5, it is the outer side surfaces of the annular web segments 4 which are inclined in a radial direction, while the side surfaces of the prominences 7 remain as for FIGS. 2 and 3.

Although the stress bushings above-illustrated each have two stressing elements 2, in practice the stress bushings described herein will probably have only one stressing element 2.

Accordingly, I claim:

1. An elastic stress bushing for the profile-stressing of an object comprising at least one stressing element disposed around its center axis and having an elastically deformable diameter, and further comprising a set of profiled prominences at isolated locations distributed along the circumference of said stressing element adapted to support said object on load bearing surfaces of the respective prominences, wherein the stressing element(s) of said elastic bushing contains at least two outwardly open radial grooves and at least one inwardly open radial groove, which grooves are axially delimited by annular web segments and radially delimited by inner and outer stress covers, which are generally of cylindrical shape; the profiled prominences being provided on and being integral with at least two of the outer stress covers, and being circumferentially spaced around the respective covers, with the prominences on one of the covers being axially aligned with the prominences on another of the covers and the elastic bushing being adapted to expand radially when compressed axially.

2. The stress bushing according to claim 1 wherein each profiled prominence is arranged radially outward from and contiguous to each outer stress cover and wherein at least two profiled prominences are provided in symmetrical circumferential sequence around each stressing element.

3. The stress bushing according to claim 2; characterized in that the circumferential length of each profiled prominence extends over only a part of the outer circumference of its corresponding outer stress cover.

4. The stress bushing according to claim 1 wherein the radial height of each profiled prominence is equal to at least half the radial thickness of its corresponding stress cover.

5. A stress bushing according to claim 3 wherein the stressing element has load bearing surfaces defined by inclined outer side surfaces of each profiled prominence.

6. The stress bushing according to claim 1 wherein two or more stressing elements are symmetrically provided along the axial length of said bushing.

* * * * *